(12) United States Patent
Ganick et al.

(10) Patent No.: US 11,770,224 B1
(45) Date of Patent: Sep. 26, 2023

(54) GUARANTEED FEED OBSERVANCE WINDOW FOR TELECOMMUNICATION

(71) Applicant: Preddio Technologies Inc., North Andover, MA (US)

(72) Inventors: Aaron T. Ganick, Boxford, MA (US); Scott Kelly, Pelham, NH (US); Brian Rheaume, Westford, MA (US)

(73) Assignee: Preddio Technologies Inc., North Andover, MA (US)

( * ) Notice: Subject to any disclaimer, the term of this patent is extended or adjusted under 35 U.S.C. 154(b) by 0 days.

(21) Appl. No.: 17/809,458

(22) Filed: Jun. 28, 2022

(51) Int. Cl.
*H04W 4/00* (2018.01)
*H04L 5/00* (2006.01)

(52) U.S. Cl.
CPC .................... *H04L 5/0044* (2013.01)

(58) Field of Classification Search
CPC ...................................................... H04L 5/0044
See application file for complete search history.

(56) References Cited

U.S. PATENT DOCUMENTS

| | | | |
|---|---|---|---|
| 7,574,531 | B2 | 8/2009 | Bennett et al. |
| 8,230,148 | B2 | 7/2012 | Henig |
| 8,874,756 | B2 | 10/2014 | Kikkawa et al. |
| 9,646,073 | B2 | 5/2017 | Mashinchi et al. |
| 10,116,806 | B2 | 10/2018 | Bhalla et al. |
| 10,524,298 | B2 | 12/2019 | Choi et al. |
| 11,025,693 | B2 | 6/2021 | Mehta et al. |
| 11,044,537 | B2 | 6/2021 | Mandapaka et al. |
| 2008/0080437 | A1* | 4/2008 | Krishnaswamy ..... H04L 1/1671 370/338 |
| 2008/0163000 | A1 | 7/2008 | Mckim et al. |
| 2011/0317017 | A1 | 12/2011 | Shin et al. |
| 2019/0129410 | A1 | 5/2019 | Cella et al. |
| 2019/0227537 | A1 | 7/2019 | Cella et al. |
| 2020/0089211 | A1 | 3/2020 | Cella et al. |

FOREIGN PATENT DOCUMENTS

| | | | | |
|---|---|---|---|---|
| AU | 2002342443 A1 * | 6/2003 | ............. | H04L 47/10 |
| WO | WO-03047181 A1 * | 6/2003 | ............. | H04L 47/10 |
| WO | WO-2005002257 A2 * | 1/2005 | ............. | H04W 48/18 |
| WO | 2020229505 A1 | 11/2020 | | |

OTHER PUBLICATIONS

International Search Report for International Application No. PCT/US22/73399, dated Nov. 15, 2022.

(Continued)

*Primary Examiner* — Thai D Hoang
(74) *Attorney, Agent, or Firm* — Husch Blackwell LLP

(57) ABSTRACT

A method and system for implementing a guaranteed observance window is provided. Specifically, the guaranteed observance window may be implemented in telecommunication. The method may include determining an available message size, determining an observance window, and setting a time slot sensitivity based on the message size and the desired observance window. The method may further include detecting a first event, setting a first bit of a message to a logic high when the first event is detecting, and advancing a location of the first bit within the message with the passage of each time intervals that correspond to the time slot sensitivity.

9 Claims, 9 Drawing Sheets

(56) References Cited

OTHER PUBLICATIONS

Nguyen, et al., Beyond Indoor Presence Monitoring with Simple Sensors, PECOS, 2012, 5-14, 2012.
Baghezza, et al., From Offline to Real-Time Distributed Activity Recognition in Wireless Sensor Networks for Healthcare: A Review, Sensors, 2021, 21, 2786.
Ge, et al. Power System Real-Time Event Detection and Associated Data Archival Reduction Based on Synchrophasors, IEEE Transactions on Smart Grid, 2015, 2088-2097, 6.4.
Abadi, et al., Aurora: A New Model and Architecture for Data Stream Management, The VLDB Journal, 2003, 120-139, 12.
Liang, et al., RACNet: Reliable ACquisition Network for High-Fidelity Data Center Sensing, Microsoft Research Tech. Rep., 2008, MSR-TR-2008-144.

\* cited by examiner

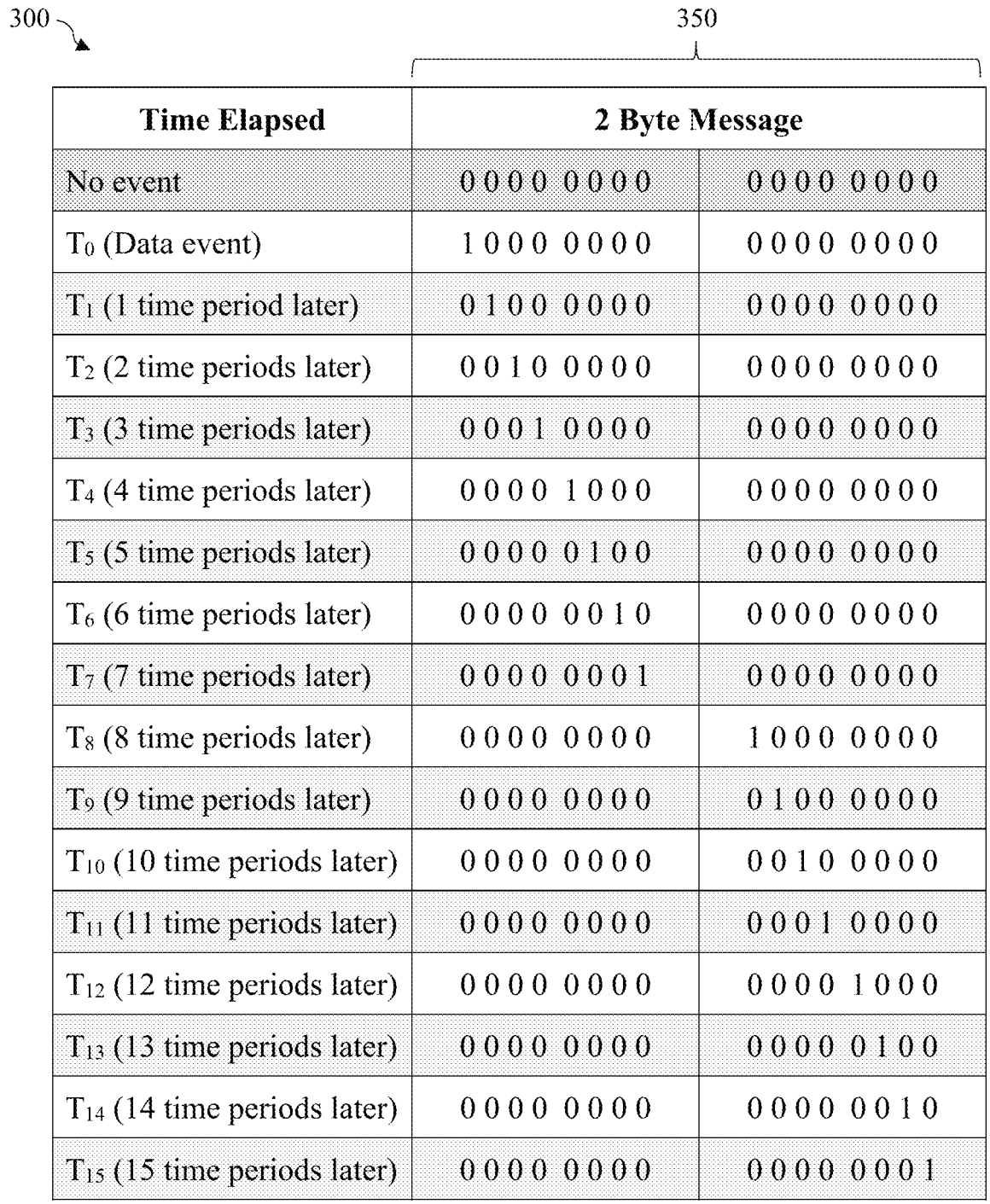

| Time Elapsed | 2 Byte Message | |
|---|---|---|
| No event | 0 0 0 0 0 0 0 0 | 0 0 0 0 0 0 0 0 |
| $T_0$ (Data event) | 1 0 0 0 0 0 0 0 | 0 0 0 0 0 0 0 0 |
| $T_1$ (1 time period later) | 0 1 0 0 0 0 0 0 | 0 0 0 0 0 0 0 0 |
| $T_2$ (2 time periods later) | 0 0 1 0 0 0 0 0 | 0 0 0 0 0 0 0 0 |
| $T_3$ (3 time periods later) | 0 0 0 1 0 0 0 0 | 0 0 0 0 0 0 0 0 |
| $T_4$ (4 time periods later) | 0 0 0 0 1 0 0 0 | 0 0 0 0 0 0 0 0 |
| $T_5$ (5 time periods later) | 0 0 0 0 0 1 0 0 | 0 0 0 0 0 0 0 0 |
| $T_6$ (6 time periods later) | 0 0 0 0 0 0 1 0 | 0 0 0 0 0 0 0 0 |
| $T_7$ (7 time periods later) | 0 0 0 0 0 0 0 1 | 0 0 0 0 0 0 0 0 |
| $T_8$ (8 time periods later) | 0 0 0 0 0 0 0 0 | 1 0 0 0 0 0 0 0 |
| $T_9$ (9 time periods later) | 0 0 0 0 0 0 0 0 | 0 1 0 0 0 0 0 0 |
| $T_{10}$ (10 time periods later) | 0 0 0 0 0 0 0 0 | 0 0 1 0 0 0 0 0 |
| $T_{11}$ (11 time periods later) | 0 0 0 0 0 0 0 0 | 0 0 0 1 0 0 0 0 |
| $T_{12}$ (12 time periods later) | 0 0 0 0 0 0 0 0 | 0 0 0 0 1 0 0 0 |
| $T_{13}$ (13 time periods later) | 0 0 0 0 0 0 0 0 | 0 0 0 0 0 1 0 0 |
| $T_{14}$ (14 time periods later) | 0 0 0 0 0 0 0 0 | 0 0 0 0 0 0 1 0 |
| $T_{15}$ (15 time periods later) | 0 0 0 0 0 0 0 0 | 0 0 0 0 0 0 0 1 |

FIG. 3

GUARANTEED FEED OBSERVANCE WINDOW FOR TELECOMMUNICATION

BRIEF SUMMARY OF THE INVENTION

This disclosure generally relates to broadcasting data telecommunication. Specifically, this disclosure relates to a data loss prevention technique by employing an observance window within data packages.

BACKGROUND OF THE INVENTION

Today, it is common to deploy sensors in various settings, such as consumer, commercial, and industrial. These sensors typically employ one of the communication protocols that form an Internet-of-Things (IoT), some of which include WiFi, Bluetooth, and Z-Wave.

Sensors may be used for many scenarios. For example, in a consumer settings, sensors may be used as a part of a home security system. In this example, sensors may be motion sensors, door or window sensors, flame and smoke sensors, and the like. In commercial settings, sensors may be used as a part of a monitoring system, such as to account for how crowded a store is, or to detect stolen merchandise. In industrial settings, sensors may be used as a part of a control system, such as to monitor environmental parameters, detect system malfunctions, or to monitor plant performances.

Typically, a sensor is configured to report an alarm condition to a central hub. For instance, when a door sensor detects that the door has been opened, the door sensor may send an alarm to the central hub that may be connected with a plurality of sensors in addition to the door sensor. The central hub may then notify a user of the alarm condition.

Alarm conditions are often treated as a Boolean, such that if an alarm condition is detected, the sensor may be configured to send a logic HIGH (such as a "1"). Alternatively, if no alarm condition is detected, the sensor may not send any communication to the central hub at all. Or the sensor may be configured to periodically send a logic LOW (such as a "0") to represent that no alarm condition has been detected.

Moreover, some sensors may be configured to reset their flags. That is to say, when an alarm condition is detected, the sensor may be configured to send a logic HIGH. Thereafter, after a period of time (such as ten-minutes), the sensor may revert back to either sending no signal to the central hub, or periodically broadcasting a logic LOW.

In such scenarios, there is a need to keep track of historical transmissions. Using the example above, if a user inquires alarm conditions half an hour later after the alarm event, the user may mistakenly believe that no alarm condition was ever detected because the sensors already reverted back to sending no signal or broadcasting a logic LOW at the time of the user's inquire.

Alternatively, even if the sensors never reset their flags, it may still be helpful for the user to know when the alarm condition was first detected. As such, there is a need to keep track of when a signal is received and when the signal is updated.

In broader communication setting, it may also be helpful to know when a data package is received, not just whether a data package has been received. Thus, there is also a need to keep track of when a package is received.

BRIEF DESCRIPTION OF THE DRAWINGS

FIG. 3 illustrates a data scheme employing a guaranteed observance window utilizing a two byte data structure according to an example embodiment;

Figure 1:
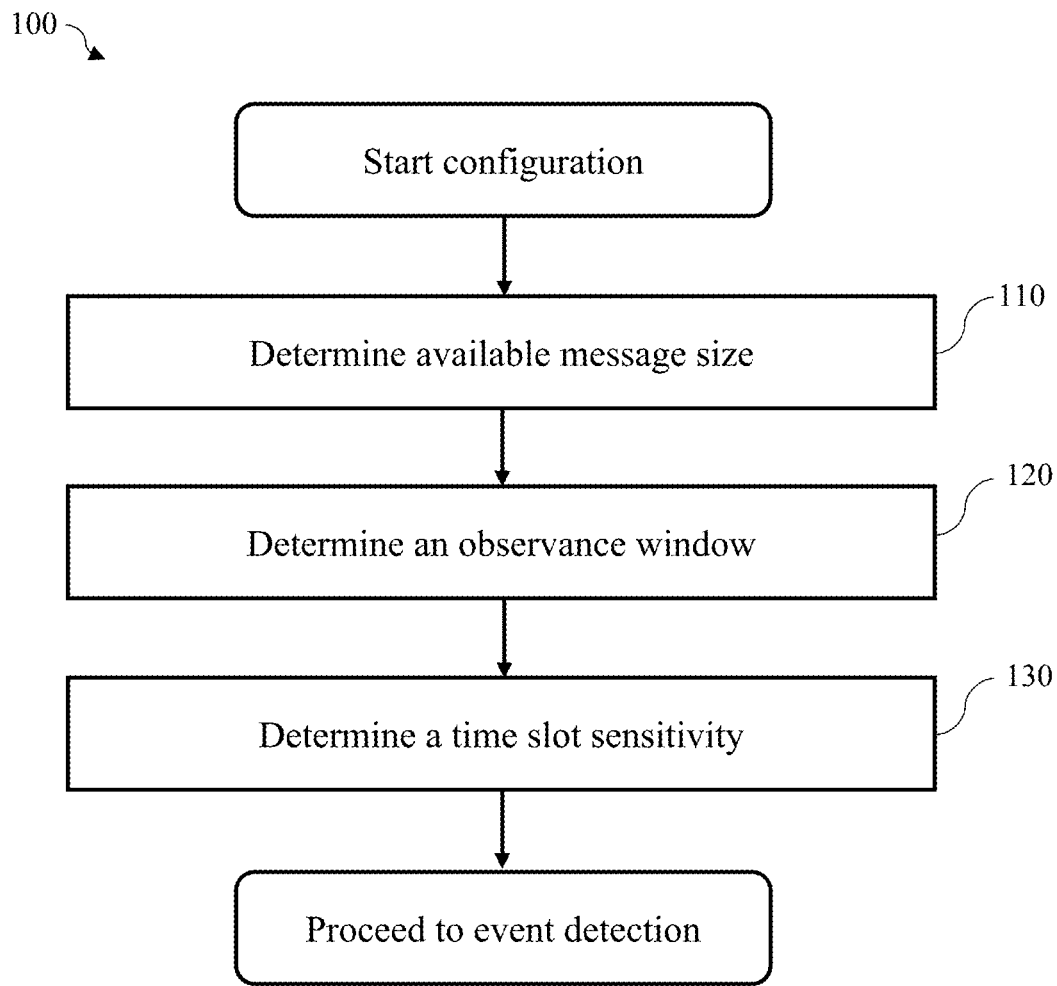
FIG. 1 illustrates a process diagram of configuring a guaranteed observance window according to an example embodiment.

Before explaining the disclosed embodiment of the present invention in detail, it is to be understood that the invention is not limited in its application to the details of the particular arrangement shown, since the invention is capable of other embodiments. Example embodiments are illustrated in the referenced figures of the drawings. It is intended that the embodiments and figures disclosed herein are to be considered illustrative rather than limiting. Also, the terminology used herein is for the purpose of description and not of limitation.

DETAILED DESCRIPTION

Although this invention is susceptible of embodiments in many different forms, there are shown in the drawings and are described in detail herein specific embodiments with the understanding that the present disclosure is an exemplification of the principles of the invention. It is not intended to limit the invention to the specific illustrated embodiments. The features of the invention disclosed herein in the description, drawings, and claims may be significant, both individually and in desired combinations, for the operation of the invention in its various embodiments. Features from one embodiment may be used in other embodiments of the invention.

Referring to FIG. 1 a configuration process 100 to configuring a guaranteed observance window is shown. The configuration process 100 may be used during a initialization of a system that supports the guaranteed observance window, or it may also be used for reconfiguring an already configured system that supports the guaranteed observance window.

At Step 110, an available message size may be determined. The available message size may depend on the communication protocol used. By way of example, if the underlying communication protocol is Bluetooth Low Energy (BLE), an advertisement packet for a BLE enabled device is typically limited to 31 bytes. In such case, the available message size may be 31 bytes.

However, using the BLE advertisement package as an example, not all 31 bytes may be available to carry a payload. For example, it is possible that even though a BLE advertisement packet has 31 bytes total, only 8 bytes are useable for transmitting a payload. In such case, the available message size may be determined to be 8 bytes. Alternatively, it may be that within a data packet, only 2 bytes or 4 bytes are available to carry a payload. In such cases, the available message size may be 2 bytes and 4 bytes respectively.

Of course, implementation of the guaranteed observance window need not utilize all available bytes within a data packet. For example, even if an underlying communication protocol supports a payload size of 8 bytes, it is possible to only reserve 2 bytes of such data packet to implement the guaranteed observance window, thus freeing the remaining 6 bytes for other purposes.

At Step 120, an observance window may be determined. The observance window may be a period of time in which a user wishes to monitor data events or alarm conditions. For example, the user may wishes to monitor data events over an eight hour period, thus setting the observance window to be eight hours. Alternatively, the user may wishes to monitor data events over an hour and twenty minutes, thus setting the observance window to be an hour and twenty minutes. Certainly, there is no durational limits to the observance window, meaning the observance window may be as small (such as in seconds or milliseconds) or as large (such as in hours or even days) as possible, with the caveat that a time slot sensitivity at Step 130 would depend on the observance window determined at Step 120.

At Step 130, the time slot sensitivity may be determined. In an example embodiment, the time slot sensitivity may be obtained based on the available message size and the observance window as shown in Equation 1.

$$\text{Available Message Size} * \text{Time Slot Sensitivty} = \text{Observance Window} \quad \text{EQUATION 1}$$

For example, if the available message size is 2 bytes—meaning 16 bits are available—and the observance window is an hour and twenty minutes (i.e., 80 minutes), that means the time slot sensitivity would be 5 minutes.

As another example, if the available message size is 4 bytes, and the desired time slot sensitivity is every one minute, then the observance window would be 32 minutes.

Put differently, a time slot sensitivity may be the frequency of how often a message may be updated. If the time slot sensitivity is every minute, that means the message may be updated every minutes, whereas if the time slot sensitivity is every five minutes, then the message may be updated every five minutes.

Depending on the implementation, the time slot sensitivity may be as high (such as every minute or every 30 seconds) or as low (such as every 30 minutes or every hour) as needed. In implementations where power management is prioritized, the time slot sensitivity may be lower to reduce the frequency of updating the message at the tradeoff of less clarity in the observance window. Alternatively, in implementations where data clarity is prioritized, the time slot sensitivity may be higher to increase the frequency of updating the message at the tradeoff of increased power consumptions.

In some embodiments, the time slot sensitivity may coincide with a time interval provided by the underlying communication protocol. For example, if BLE advertisement packets are used, the time slot sensitivity may coincide with an advertisement interval. In other embodiments, the time slot sensitivity may be customized by an equipment manufacturer and/or by the user. For example, in an embodiment, an advertisement interval may be every two seconds, whereas the time slot sensitivity may be every minute.

In the example embodiment shown in FIG. 1, the time slot sensitivity may be determined as a function of the available message size and the observance window. In other embodiments, it may be desirable to define the time slot sensitivity, thus using Equation 1, the observance window may be determined as a function of the available message size and the time slot sensitivity. In yet other embodiments, a data packet may have a large number of available space for payloads. In such case, it may be desirable to define both the time slot sensitivity and the observance window, thus using Equation 1, the available message size (or in this case, the necessary message size) may be determined as a function of the time slot sensitivity and the observance window.

Once the observance window and the time slot sensitivity are determined in the configuration process 100, the guaranteed observance window may be implemented for event detections.

Figure 2:
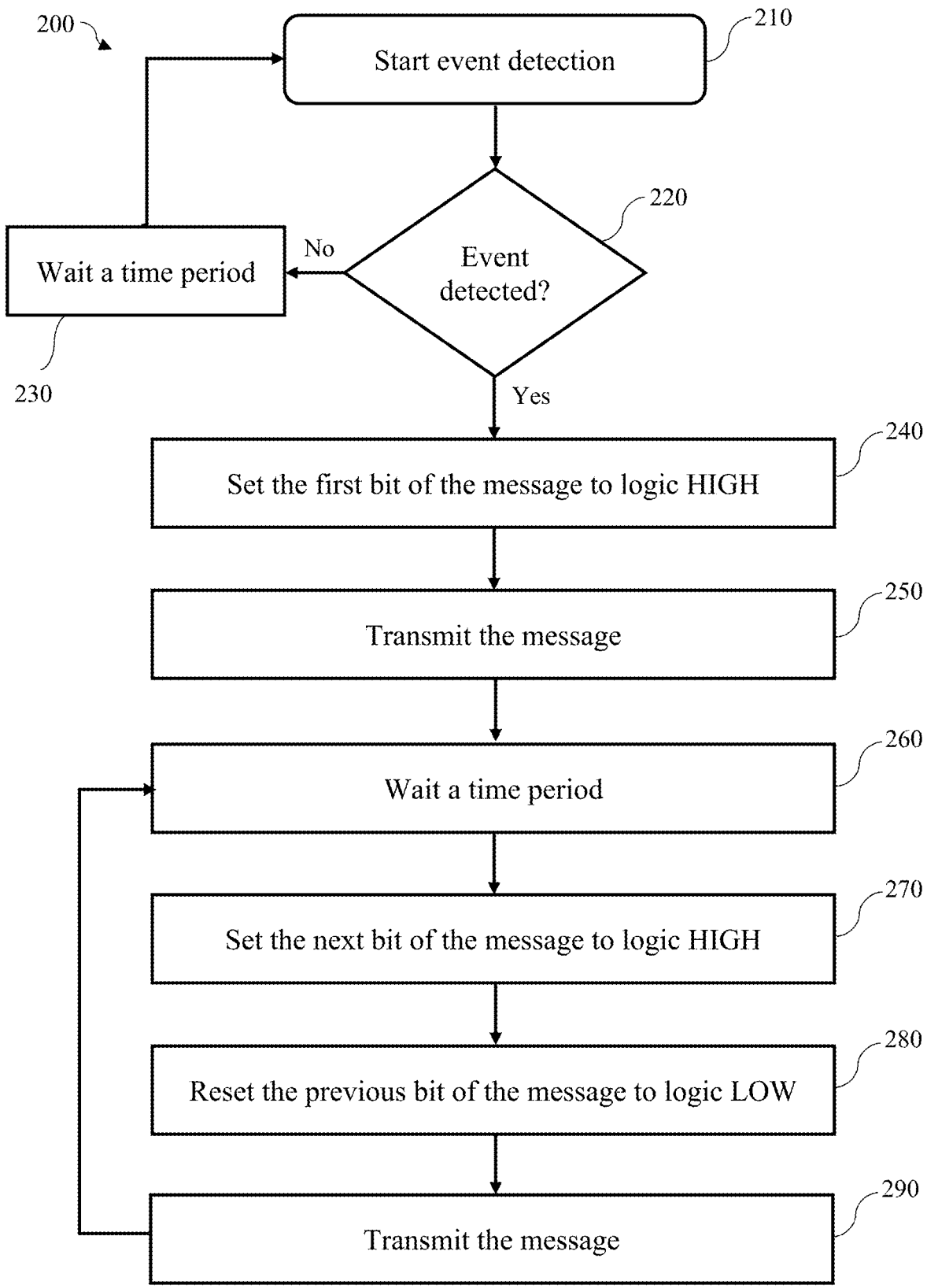
FIG. 2 illustrates a process diagram of an event detection while employing a guaranteed observance window according to a first example embodiment.
Figure 4:
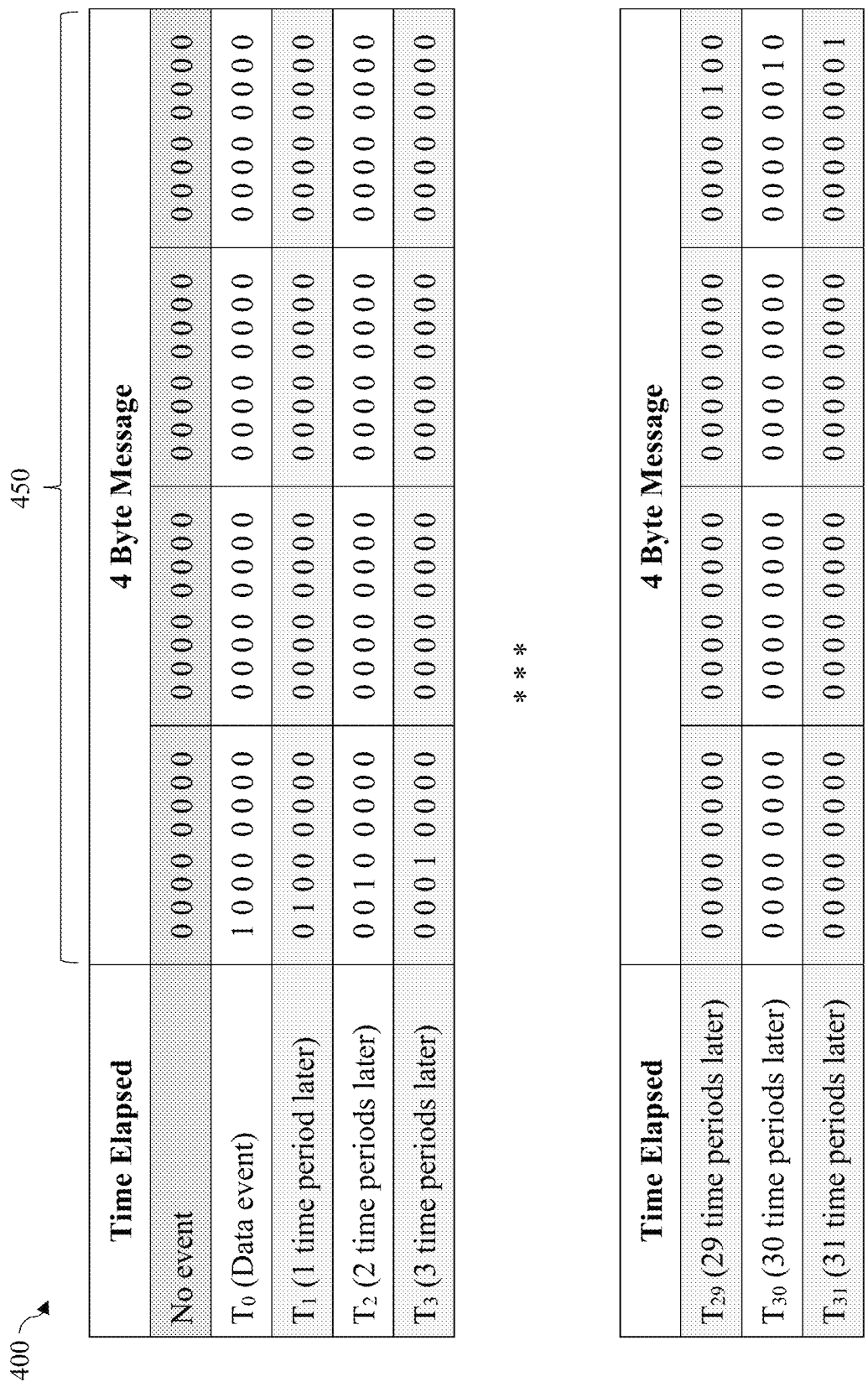
FIG. 4 illustrates a data scheme employing a guaranteed observance window utilizing a four byte data structure according to an example embodiment.

FIGS. 2-4 illustrate embodiments of implementing a guaranteed observance window to observe one event. Referring to FIG. 2, an event detection process 200 is shown according to an example embodiment.

At Step 210, the event detection process 200 starts. Step 210 may begin automatically after the configuration process 100 is done configuring a supporting system, or Step 210 may be initiated on-demand or as-requested.

At Step 220, a determination of whether an event is detected may be made. In embodiments where the guaranteed observance window is implemented by a sensor or other peripheral devices, the event detection may correspond to an event that the sensor is suitable to detect. For example, if the sensor is a door sensor, the event may be when the sensor detects that the door has been opened. Likewise, if the sensor is a parameter sensor (such as a temperature sensor, a vibration sensor, a humidity sensor, or the like), the event may be when the parameter exceeds or falls below a specific threshold, such as when a temperature sensor detects that the temperature measured by the sensor exceeds 100 degree Celsius. In yet another example, the event may be when a motion sensor detects every tenth motion. In additional embodiments, the event may be a completion of a data transmission.

In embodiments where the guaranteed observance window is implemented by a hub, the event detection may be relayed from a connected sensor. For example, if one of the sensors associated with the hub detects an alarm condition, the sensor may transmit a signal to the hub. Upon receiving said signal from said sensor, the hub may treat the receiving of said signal as an event has been detected for Step 220's purpose even though the underlying detection is done by the sensor and not by the hub itself.

If no event is detected at Step 220, the event detection process 200 may then proceed to Step 230. At Step 230, a first pause may be implemented for a first time period. In some embodiments, the first time period may be defaulted to coincide with the time slot sensitivity. For instance, if the time slot sensitivity is five minutes, then the first pause may be for five minutes. In other embodiments, the first time period may be defined by the equipment manufacturer and/or by the user. Thereafter, the event detection process 200 may be restarted by again proceeding to Step 210.

If an event is detected at Step 220, the event detection process 200 may proceed to Step 240 where the first bit of a message may be set to a logic HIGH. In most embodiments, the message may take a form of a data packet, or a part of a data packet. For example, the message may be included in a payload for a BLE advertisement packet. Alternatively, the message may be a standalone data packet within an implementing system. In a Boolean setting, a logic HIGH may be represented by a "1" in a bit within a data packet.

At Step 250, the message may be transmitted using suitable communication protocols, such as via Bluetooth, WiFi, Z-wave, or through hardwire transmission. In embodiments where the guaranteed observance window is implemented by a sensor or other peripheral devices, the message may be transmitted or otherwise communicated to a hub.

In embodiments where the guaranteed observance window is implemented by a hub, the message may be transmitted to a user device or terminal (such as a cell phone, a personal computer, or a control terminal) either directly or through intermediate servers using suitable communication protocols such as the internet, cellular network, or other appropriate telecommunication channels. In further embodiments, instead of or in addition to transmitting the message at Step 250, the message may be stored for record keeping or other purposes. In yet other embodiments, Step 250 may be omitted altogether, meaning the message need not be transmitted to another device.

At Step 260, a second pause may be implemented for a second time period. In most embodiments, the second time period may be the time slot sensitivity. For example, if the time slot sensitivity is five minutes, then the second pause may be for five minutes.

At Step 270, which is a second time period after the event has been detected, the implementing system may be configured to set the next bit of the message to a logic HIGH. In some embodiments, a first counter may be used to implement the event detection process 200. For example, the first counter may initially be set to "0". When an event is detected at Step 220, the first counter may be increased by one increment, resulting in "1". This may denote to the implementing system that the first bit of the message should be set to a logic HIGH. At Step 270, the first counter may again be increased by another increment, resulting in "2". This then may denote to the implementing system that the second bit of the message should be set to a logic HIGH. Thus, when the first counter is "n", the implementing system may be configured to set the "n"th bit of the message to a logic HIGH, and so forth.

At Step 280, the previous bit of the message may be reset to a logic LOW. In a Boolean setting, a logic LOW may be represented by a "0" in a bit within a data packet. Using the first counter example from above, when the first counter is "2", this may denote to the implementing system that the first bit of the message should be reset to a logic LOW. Thus, when the first counter is "n", the implementing system may be configured to reset the "n-1"th bit of the message to a logic LOW, and so forth.

At Step 290, the revised message may be transmitted suitable communication protocols, such as via Bluetooth, WiFi, Z-wave, or through hardwire transmission. In embodiments where the guaranteed observance window is implemented by a sensor or other peripheral devices, the revised message may be transmitted or otherwise communicated to a hub.

In embodiments where the guaranteed observance window is implemented by a hub, the revised message may be transmitted to a user device or terminal (such as a cell phone, a personal computer, or a control terminal) either directly or through intermediate servers using suitable communication protocols such as the internet, cellular network, or other appropriate telecommunication channels. In further embodiments, instead of or in addition to transmitting the revised message at Step 290, the revised message may be stored for record keeping or other purposes. In yet other embodiments, Step 290 may be omitted altogether, meaning the revised message need not be transmitted to another device.

Put differently, Step 240 may be understood as defining a first data packet including a first message, and Step 250 may be understood as transmitting the first data packet. Whereas Step 270 and Step 280 may be understood as defining a second data packet including a second message, where the second message is a modified first message, and Step 290 may be understood as transmitting the second data packet.

After Step 290 (or if Step 290 is omitted, after Step 280), the implementing system may be configured to return to Step 260 for another pause for a duration of the second time period. In embodiments where the first counter is utilized, the first counter may be increased by an increment whenever Step 260 is executed.

FIG. 3 illustrates an example embodiment of a data scheme 300 employing a guaranteed observance window utilizing a two byte data structure. In this example embodiment, a two byte message 350 may be used to implement the guaranteed observance window. Initially, prior to any event being detected, the message 350 may comprise of all "0", denoting no event has been detected. Alternatively, an implementing system need not transmit the message 350 if no event has been detected.

A moment of time when an event is detected at Step 220 of the event detection process 200 may be denoted as $T_0$. At $T_0$, the first bit of the message 350 may be changed to "1", with the remaining bits remaining to be "0". When the bit change happen may depend on a clock cycle. In some embodiments, the bit change may happen instantaneous or near instantaneous as soon as the event is detected. In other embodiments, there may be a time delay between when the event is detected and when the bit change happen.

At $T_1$, the next bit of the message 350 may be changed to "1", while the previous bit (i.e., the first bit at $T_1$) may be reset back to "0". The time period between $T_0$ and $T_1$ may coincide with the time slot sensitivity. Illustratively, if the time slot sensitivity of the data scheme 300 is set at five minutes, then $T_1$ may happen five minutes after $T_0$, and $T_2$ may happen five minutes after $T_1$, and so forth.

At $T_2$, which is one time slot sensitivity after $T_1$ and two time slot sensitivity after $T_0$, the next bit of the message 350 may be set to "1" and the previous bit may be reset to "0". Using the five minutes time slot sensitivity as an example, $T_2$ may occur five minutes after $T_1$, and ten minutes after $T_0$, which was when the event was originally detected.

The same process described above for $T_2$ may be repeated for $T_3$ through $T_{15}$ until the "1" is at the last bit of the message 350. Illustratively, if the time slot sensitivity is five minutes, $T_{15}$ may occur seventy-five minutes after the event has been detected at $T_0$. Thus, by examining the message 350, a user or an implementing system may decode when the event was detected up to at least eighty minutes after the event detection by examining which slot of the message 350 is "1", while knowing the available message size—which is two bytes in this example—and the time slot sensitivity.

FIG. 4 illustrates another example embodiment of a data scheme 400 employing a guaranteed observance window utilizing a four byte data structure. Similar to data scheme 300 of FIG. 3, in data scheme 400, a four byte message 450 may be used to implement the guaranteed observance window. Initially, prior to any event being detected, the message 450 may comprise of all "0", denoting no event has been detected. Alternatively, an implementing system need not transmit the message 450 if no event has been detected.

A moment of time when an event is detected at Step 220 of the event detection process 200 may be denoted as $T_0$. At $T_0$, the first bit of the message 450 may be changed to "1", with the remaining bits remaining to be "0". When the bit change happen may depend on a clock cycle. In some embodiments, the bit change may happen instantaneous or near instantaneous as soon as the event is detected. In other embodiments, there may be a time delay between when the event is detected and when the bit change happen.

At $T_1$, the next bit of the message 450 may be changed to "1", while the previous bit (i.e., the first bit at $T_1$) may be reset back to "0". The time period between $T_0$ and $T_1$ may coincide with the time slot sensitivity. Illustratively, if the time slot sensitivity of the data scheme 400 is set at one minute, then $T_1$ may happen one minute after $T_0$, and $T_2$ may happen one minute after $T_1$, and so forth.

At $T_2$, which is one time slot sensitivity after $T_1$ and two time slot sensitivity after $T_0$, the next bit of the message 450 may be set to "1" and the previous bit may be reset to "0". Using the one minute time slot sensitivity as an example, $T_2$ may occur one minute after $T_1$, and two minutes after $T_0$, which was when the event was originally detected.

The same process described above for $T_2$ may be repeated for $T_3$ through $T_{31}$ until the "1" is at the last bit of the message 450. Illustratively, if the time slot sensitivity is one minute, $T_{31}$ may occur thirty-one minutes after the event has been detected at $T_0$. Thus, by examining the message 450, a user or an implementing system may decode when the event was detected up to at least thirty-two minutes after the event detection by examining which slot of the message 450 is "1", while knowing the available message size—which is four bytes in this example—and the time slot sensitivity.

Figure 5:
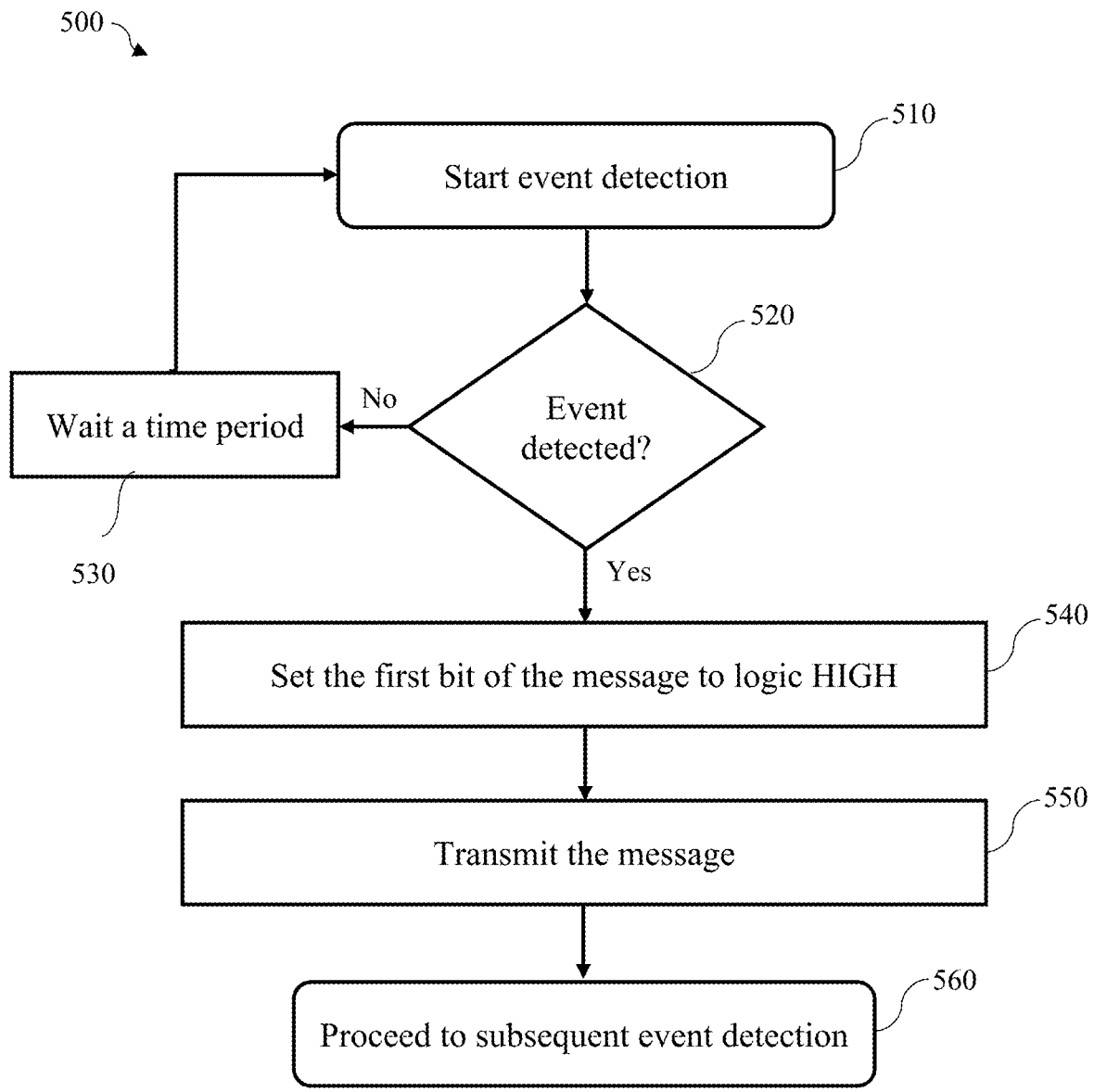
FIG. 5 illustrates a process diagram of an event detection while employing a guaranteed observance window to observe multiple events according to a second example embodiment.
Figure 6:
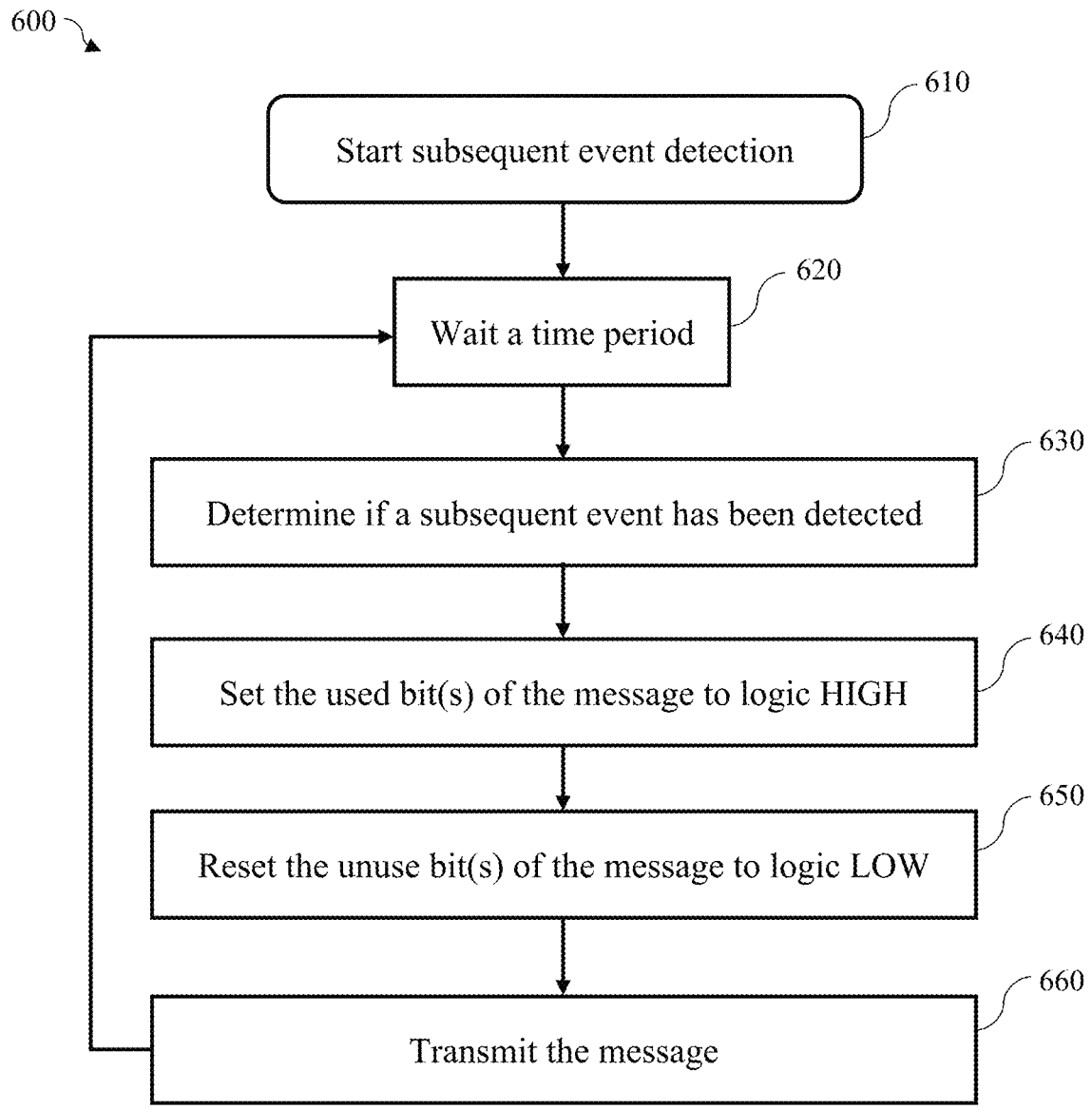
FIG. 6 illustrates a process diagram of a subsequent event detection while employing a guaranteed observance window to observe multiple events according to the second example embodiment.

FIGS. 5-8 illustrate embodiments of implementing a guaranteed observance window to observe one or more events. Referring to FIGS. 5 and 6, an event detection process 500 and a subsequent event detection process 600 are shown.

For the event detection process 500, Steps 510-550 are largely similar to Steps 210-250 of the event detection process 200 shown in FIG. 2.

At Step 510, the event detection process 500 starts. Step 510 may begin automatically after the configuration process 100 is done configuring a supporting system, or Step 510 may be initiated on-demand or as-requested.

At Step 520, a determination of whether an event is detected may be made. In embodiments where the guaranteed observance window is implemented by a sensor or other peripheral devices, the event detection may correspond to an event that the sensor is suitable to detect. For example, if the sensor is a door sensor, the event may be when the sensor detects that the door has been opened. Likewise, if the sensor is a parameter sensor (such as a temperature sensor, a vibration sensor, a humidity sensor, or the like), the event may be when the parameter exceeds or falls below a specific threshold, such as when a temperature sensor detects that the temperature measured by the sensor exceeds 100 degree Celsius. In yet another example, the event may be when a motion sensor detects every tenth motion. In additional embodiments, the event may be a completion of a data transmission.

In embodiments where the guaranteed observance window is implemented by a hub, the event detection may be relayed from a connected sensor. For example, if one of the sensors associated with the hub detects an alarm condition, the sensor may transmit a signal to the hub. Upon receiving said signal from said sensor, the hub may treat the receiving of said signal as an event has been detected for Step 520's purpose even though the underlying detection is done by the sensor and not by the hub itself.

If no event is detected at Step 520, the event detection process 500 may then proceed to Step 530. At Step 530, a third pause may be implemented for a third time period. In some embodiments, the third time period may be defaulted to coincide with the time slot sensitivity. For instance, if the time slot sensitivity is five minutes, then the third pause may be for five minutes. In other embodiments, the third time period may be defined by the equipment manufacturer and/or by the user. Thereafter, the event detection process 500 may be restarted by again proceeding to Step 510.

If an event is detected at Step 520, the event detection process 500 may proceed to Step 540 where the first bit of a message may be set to a logic HIGH. In most embodiments, the message may take a form of a data packet, or a part of a data packet. For example, the message may be included in a payload for a BLE advertisement packet. Alternatively, the message may be a standalone data packet within an implementing system. In a Boolean setting, a logic HIGH may be represented by a "1" in a bit within a data packet.

At Step 550, the message may be transmitted using suitable communication protocols, such as via Bluetooth, WiFi, Z-wave, or through hardwire transmission. In embodiments where the guaranteed observance window is implemented by a sensor or other peripheral devices, the message may be transmitted or otherwise communicated to a hub.

At Step 560, the event detection process 500 may proceed to the subsequent event detection process 600 shown in FIG. 6.

Referring to FIG. 6, at Step 610, the subsequent event detection process 600 starts. Step 610 may begin automatically after the event detection process 500, or Step 610 may be initiated on-demand or as-requested.

At Step 620, a fourth pause may be implemented for a fourth time period. In most embodiments, the fourth time period may be the time slot sensitivity. For example, if the time slot sensitivity is five minutes, then the fourth pause may be for five minutes.

At Step 630, which is a fourth time period after the event has been detected, the implementing system may be configured to determine whether a subsequent event has been detected either at that moment Step 630 is executed, or during the fourth time period after the original event was detected at Step 520.

The process of detecting a subsequent event may be substantially similar to Step 520. Such that in embodiments where the guaranteed observance window is implemented by a sensor or other peripheral devices, the subsequent event detection may correspond to an event that the sensor is suitable to detect. For example, if the sensor is a door sensor, the event may be when the sensor detects that the door has been opened. Likewise, if the sensor is a parameter sensor (such as a temperature sensor, a vibration sensor, a humidity sensor, or the like), the event may be when the parameter exceeds or falls below a specific threshold, such as when a temperature sensor detects that the temperature measured by the sensor exceeds 100 degree Celsius. In yet another example, the event may be when a motion sensor detects every tenth motion. In additional embodiments, the event may be a completion of a data transmission.

In embodiments where the guaranteed observance window is implemented by a hub, the subsequent event detection may be relayed from a connected sensor. For example, if one of the sensors associated with the hub detects an alarm condition, the sensor may transmit a signal to the hub. Upon receiving said signal from said sensor, the hub may treat the receiving of said signal as a subsequent event has been detected for Step 630's purpose even though the underlying detection is done by the sensor and not by the hub itself.

The subsequent event detected at Step 630 may be the same event as the event detected at Step 520, or it may be a different event. For example, if an underlying sensor is a smoke detector and a fire triggered the event detection at Step 520, the fire may still be ongoing by the time the subsequent event detection process reaches Step 630—which is a fourth time period after the event detected at Step 520. In this case, because the fire is ongoing, at Step 630, a subsequent event would be detected.

In another example, if an underlying sensor is a motion sensor, and a first person's motion triggered the event detection at Step 520, the first person may be long gone by the time the subsequent event detection process reaches Step 630 depending on the fourth time period. However, a second person's motion may be detected at Step 630. Meaning at both Steps 520 and 640, motions have been detected, albeit for different events.

In further embodiments, events detected at Steps 520 and 630 need not be done by one sensor or a same type of sensors. For example, a first event detected at Step 520 may be a vibration event detected by a vibration sensor, while a second event detected at Step 630 may be a temperature event detected by a temperature sensor. Likewise, subsequent events (a third event, a fourth event, etc) detected at subsequent Step 630 may be a continuation of one or more events, a same type of events, or different events.

At Step 640, the implementing system may be configured to set the used of the message to a logic HIGH. In some embodiments, one or more counters may be used to implement the event detection process 500 and the subsequent event detection process 600. For example, a second counter may initially be set to "0". When an event is detected at Step 520, the second counter may be increased by one increment, resulting in "1". This may denote to the implementing system that the first bit of the message should be set to a logic HIGH. At Step 630, the second counter may again be increased by another increment, resulting in "2". This then may denote to the implementing system that the second bit of the message should be set to a logic HIGH. Thus, when the second counter is "n", the implementing system may be configured to set the "n"th bit of the message to a logic HIGH, and so forth.

Therefrom, every time a subsequent event is detected at Step 630, a new counter may be started at "1", and increased by one increment every time Step 630 is processed. Meaning, if a subsequent event is detected at Step 630, a third counter may be started with a value of "1". If yet another subsequent event is detected again after looping back to Step 620, a fourth counter may be started with a value of "1", and so forth.

At Step 640, the used bits of the message to logic HIGH. Using the counter example from above, when the second counter is "2", this may denote to the implementing system that the second bit of the message should be set to a logic HIGH. In another example where the second counter is "2" and the third counter is "1", this may denote to the implementing system that the first and second bits of the message should be reset to a logic HIGH. Similarly, if the second counter is "4", the third counter is "3", and the fourth counter is "1", this may denote to the implementing system that the first, third, and fourth bit of the message should be set to a logic HIGH, and so forth. In a Boolean setting, a logic HIGH may be represented by a "1" in a bit within a data packet.

At Step 650, the unused bit(s) of the message may be reset to a logic LOW. In a Boolean setting, a logic LOW may be represented by a "0" in a bit within a data packet. Continuing the counter example from above, when the second counter is "2", this may denote to the implementing system that all but the second bit of the message should be reset to a logic LOW. In another example where the second counter is "2" and the third counter is "1", this may denote to the implementing system that all but the first and second bits of the message should be reset to a logic LOW. Similarly, if the second counter is "4", the third counter is "3", and the fourth counter is "1", this may denote to the implementing system that all but the first, third, and fourth bit of the message should be reset to a logic LOW. In some embodiments, Step 640 may include first reset the entire message to logic LOW before setting the used bits to logic HIGH. In such embodiments, Step 650 may be omitted.

At Step 660, the revised message may be transmitted suitable communication protocols, such as via Bluetooth, WiFi, Z-wave, or through hardwire transmission. In embodiments where the guaranteed observance window is implemented by a sensor or other peripheral devices, the revised message may be transmitted or otherwise communicated to a hub.

In embodiments where the guaranteed observance window is implemented by a hub, the revised message may be transmitted to a user device or terminal (such as a cell phone, a personal computer, or a control terminal) either directly or through intermediate servers using suitable communication protocols such as the internet, cellular network, or other appropriate telecommunication channels. In further embodiments, instead of or in addition to transmitting the revised message at Step 660, the revised message may be stored for record keeping or other purposes. In yet other embodiments, Step 660 may be omitted altogether, meaning the revised message need not be transmitted to another device.

Put differently, Step 540 may be understood as defining a third data packet including a third message, and Step 550 may be understood as transmitting the third data packet. Whereas Step 640 and Step 650 may be understood as defining a fourth data packet including a fourth message, where the fourth message is a modified third message, and Step 660 may be understood as transmitting the fourth data packet.

After Step 660 (or if Step 660 is omitted, after Step 650), the implementing system may be configured to return to Step 620 for another pause for a duration of the second time period.

Figure 7:
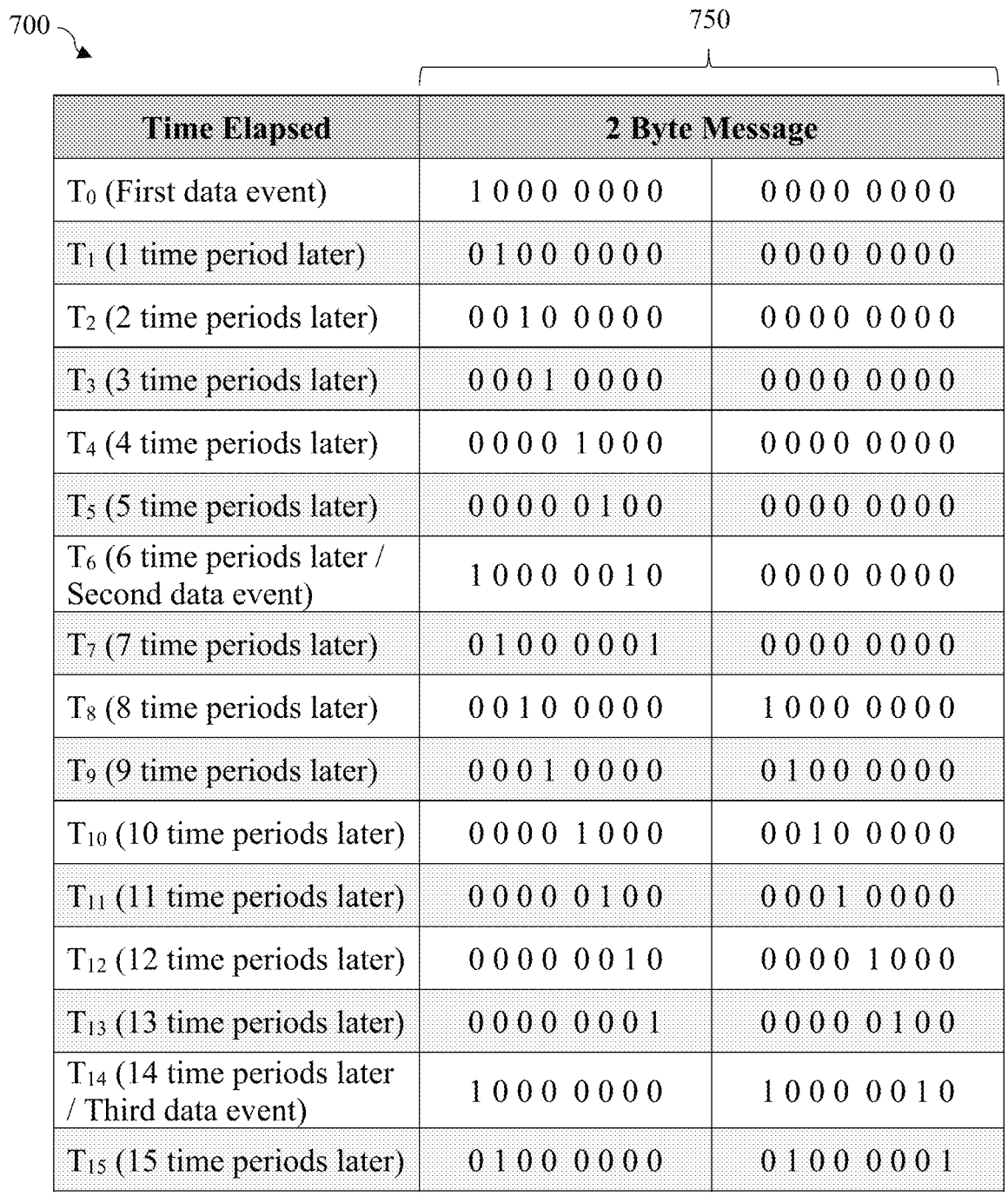
FIG. 7 illustrates a data scheme employing a guaranteed observance window to observe multiple events utilizing a two byte data structure according to an example embodiment.

FIG. 7 illustrates an example embodiment of a data scheme 700 employing a guaranteed observance window to observe one or more events utilizing a two byte data structure. In this example embodiment, a two byte message 750 may be used to implement the guaranteed observance window. Initially, prior to any event being detected, the message 750 may comprise of all "0", denoting no event has been detected. Alternatively, an implementing system need not transmit the message 750 if no event has been detected.

A moment of time when an event is detected at Step 520 of the event detection process 500 may be denoted as $T_0$. At $T_0$, the first bit of the message 750 may be changed to "1", with the remaining bits remaining to be "0". When the bit change happen may depend on a clock cycle. In some embodiments, the bit change may happen instantaneous or near instantaneous as soon as the event is detected. In other embodiments, there may be a time delay between when the event is detected and when the bit change happen.

At $T_1$, the used bit of the message 750 may be changed to "1". As explained previously, the used bit may be tracked using counters or other suitable methods. Assuming no subsequent event has been detected at $T_1$ (or in some embodiments, between $T_0$ and $T_1$), the only used bit in this circumstance would be the second bit (first bit at Step 540 plus one increment, thus the second bit).

The time period between $T_0$ and $T_1$ may coincide with the time slot sensitivity. Illustratively, if the time slot sensitivity of the data scheme 700 is set at five minutes, then $T_1$ may happen five minutes after $T_0$, and $T_2$ may happen five minutes after $T_1$, and so forth. Assuming no subsequent event has been detected at $T_1$ (or in some embodiments, between $T_0$ and $T_1$), the unused bit(s) of the message 750 may be reset back to "0" (i.e., all bits except the second bit).

At $T_2$, which is one time slot sensitivity after $T_1$ and two time slot sensitivity after $T_0$, the used bit of the message 750 may be set to "1". Assuming no subsequent event has been detected at $T_2$ (or since $T_1$), the only used bit in this circumstance would be the third bit (first bit at Step 540 plus two increments). Assuming no subsequent event has been detected at $T_2$ (or since $T_1$), the unused bit(s) of the message 750 may be reset back to "0" (i.e., all bits except the third bit). Using the five minutes time slot sensitivity as an example, $T_2$ may occur five minutes after $T_1$, and ten minutes after $T_0$, which was when the event was originally detected.

The same process described above for $T_2$ may be repeated for $T_3$ through $T_{15}$ until the "1" is at the last bit of the message 750. Illustratively, if the time slot sensitivity is five minutes, $T_{15}$ may occur seventy-five minutes after the event has been detected at $T_0$. Thus, by examining the message 750, a user or an implementing system may decode when the event was detected up to at least eighty minutes after the event detection by examining which slot of the message 750 is "1", while knowing the available message size—which is two bytes in this example—and the time slot sensitivity.

At shown in data scheme 700, illustratively, assuming that at $T_6$ and $T_{14}$, a second event and a third event have been detected, respectively. At $T_6$, the used bits of the message 750 would be the first bit due to the second event being detected, as well as the seventh bit due to the first event being detected six time periods ago from $T_6$.

Likewise, at $T_{14}$, the used bits of the message 750 would be the first bit due to the third event being detected, the fifteen bit due to the first event being detected fourteen time periods ago from $T_{14}$, and the ninth bit due to the second event being detected eight time periods ago from $T_{14}$.

Put it more generally, every time an event is detected, the first bit of a message may be set to a logic HIGH. Thereafter, with the passing of each time period that coincides with the time slot sensitivity, the logic HIGH bit may keep shifting toward the next bit within the message throughout the observance window. Although specific algorithms have been described using counters and incrementing at certain specific steps, it is to be understood that the algorithms described are merely example, and other algorithms may be implemented that are within the spirit of the guaranteed observance window described herein.

Figure 8:
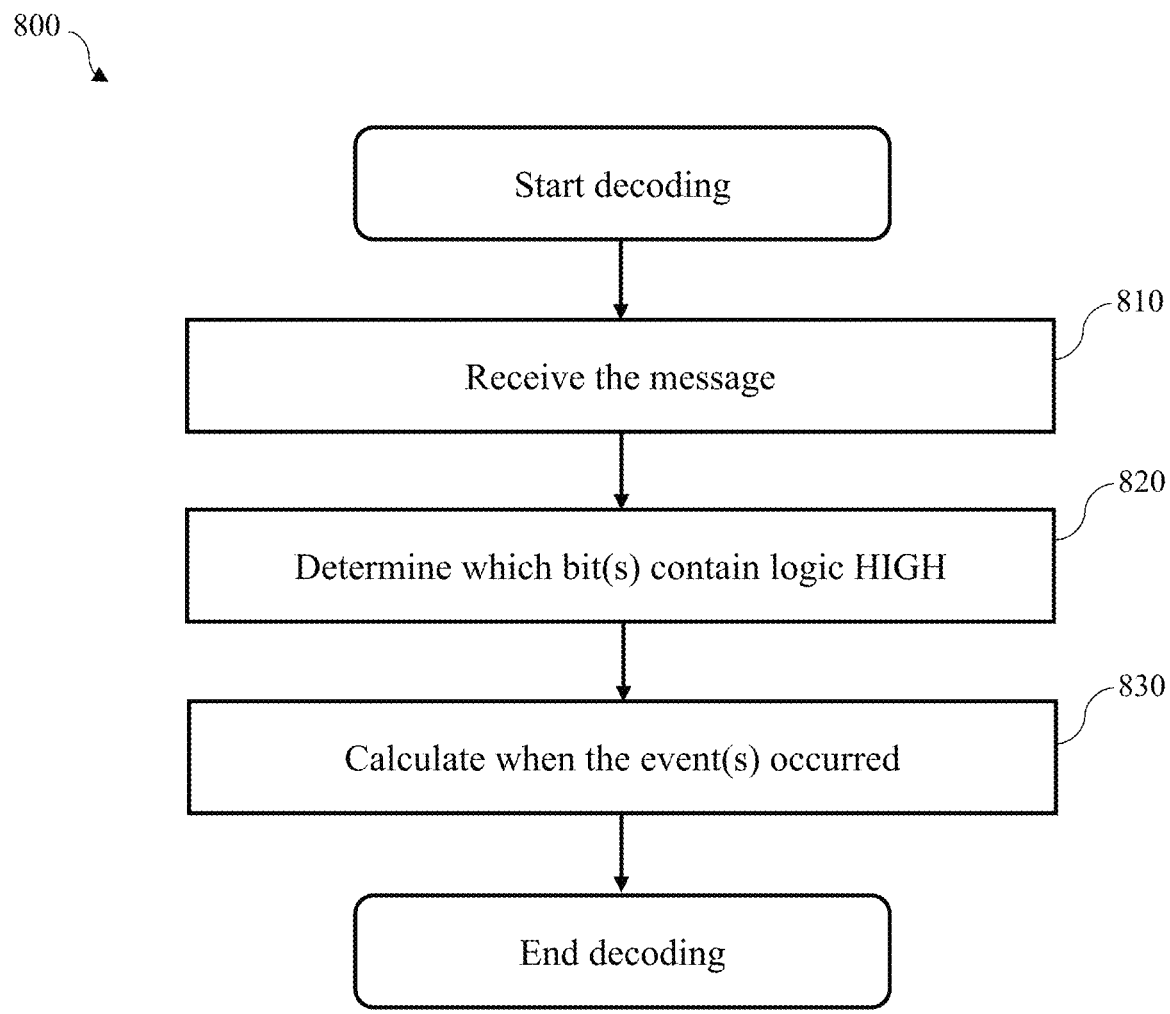
FIG. 8 illustrates a process diagram of decoding a guaranteed observance window according to an example embodiment.

FIG. 8 illustrates an example embodiment of a decoding process 800 for decoding a message utilizing a guaranteed observance window. The decoding process 800 may be implemented in a variety of settings. By way of example, if a security system is configured to utilize the guaranteed observance window, the decoding process 800 may be implemented by a central panel of the security system. In another example, the decoding process 800 may be carried out by a personal computer, a cellular phone, a control terminal, or other suitable devices.

At Step 810, a message containing a guaranteed observance window may be received. The receiving may be achieve through suitable communication protocols, such as via Bluetooth, WiFi, Z-wave, or through hardwire transmission. Using the hub and sensors example, the hub may be configured to receive a message from one of its affiliated sensors that is configured to transmit messages containing the guaranteed observance window.

In some embodiments, the message containing the guaranteed observance window may already be stored on the hub or other devices. In which case, Step 810 may be omitted or modified as a retrieving step, such as to retrieve the message from a memory or a hard drive.

At Step 820, an implementing system may be configured to determine which bit or bits of the message contain a logic HIGH. Using message 750 at $T_{15}$ from FIG. 7 as an example, the message 750 would read "0 1 0 0 0 0 0 0 0 1 0 0 0 0 0 1". In this case, the implementing system may determine that the second bit, the tenth bit, and the sixteenth bit contain a logic HIGH.

At Step 830, the implementing system may be configured to calculate when one or more events occurred using the determination from Step 820. Using the example from above, the implementing system may calculate that a first event occurred fifteen time periods ago, a second event occurred nine time periods ago, and a third event occurred one time period ago. Assuming that the implementing system already knows the time slot sensitivity for this specific configuration, the proximate time when the events happened may be calculated. Alternatively, the time slot sensitivity may be transmitted to a decoding device prior to or during the decoding process 800, or be inputted as an additional step.

Using five minutes time slot sensitivity as an example, the implementing system may calculate that the first event occurred approximately seventy-five minutes ago, the second event occurred forty-five minutes ago, and the third event occurred five minutes ago. Moreover, because the time slot sensitivity in this example is five minutes, the implementing system may calculate that the first event occurred seventy-five minutes to eighty minutes ago, the second event occurred forty-five minutes to fifty minutes ago, and the third event occurred five minutes to mere moments ago. Thus, a smaller time slot sensitivity may give a user better accuracy in knowing when an event occurred, at the tradeoff of a shorter observance window if there is only a limited available message size.

The implementing system may also be configured to perform numerous functions after performing decoding process 830. For example, the implementing system may display when the events occurred on a monitor, or send notifications or reports to one or more users through appropriate means.

Figure 9:
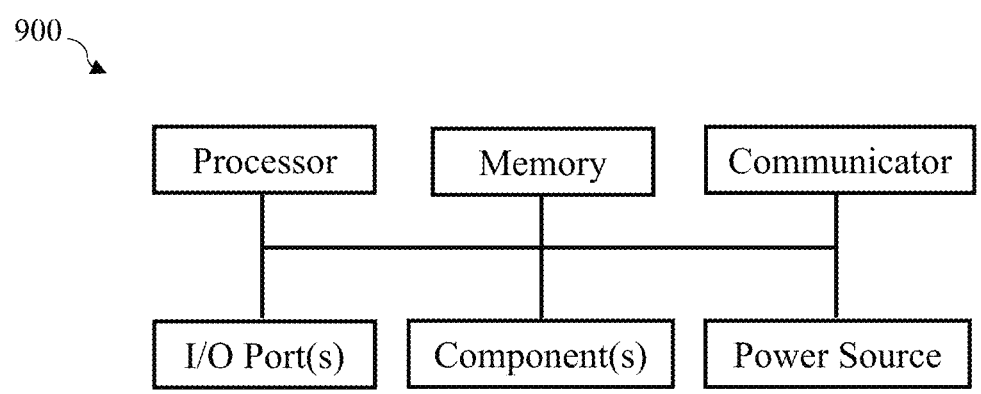
FIG. 9 illustrates an example system diagram to implement a guaranteed observance window.

FIG. 9 illustrates an example device 900 that may be used to implement the guaranteed observance window as described herein. The device 900 may include one or more components. The components may be sensors such as accelerometers, speedometers, pressure gauges, current sensors, voltage sensors, temperature gauges, motion detectors, proximity sensors, hall effect sensors, light sensors, or any other types of sensors.

The device 900 may also include a processor being coupled to a memory and a communicator (such as a Bluetooth-enabled communicator). The communicator may be a two-way transceiver, an antenna, or other communication modules known in the art. The processor may further be coupled to one or more components as aforementioned. Software or algorisms stored on the memory may cause the processor to perform the various processes described previously. Certainly, the device 900 may include additional modules such as an input/output (I/O) port, a power source such as a battery, or other additional modules as applicable.

It is to be appreciated an implementing system may include one or more devices 900. For example, one of the devices 900 in an implementing system may be a hub, and a plurality of other devices 900 may be sensors connected to the hub.

As may be appreciated, transmitting data using a guaranteed observance window may provide numerous technical benefits and improvements. For example, the implementation of a guaranteed observance window ensures that an implementing system and/or a user knows when an event occurred, even if such event occurred in the past.

When used in conjunction with telecommunication in general, a guaranteed observance window may also allow data verification to ensure that one or more transmissions have indeed been received, thus preventing data loss. For example, if a message containing the guaranteed observance window shows that a data transmission occurred five time periods ago, but no data was received, the system or an user may request a retransmission of the data from five time periods ago that was supposedly transmitted already, ensuring that no data was missed, or minimizing a likelihood of data loss.

Specific embodiments of a guaranteed observance window according to the present invention have been described for the purpose of illustrating the manner in which the invention may be made and used. It should be understood that the implementation of other variations and modifications of this invention and its different aspects will be apparent to one skilled in the art, and that this invention is not limited by the specific embodiments described. Features described in one embodiment may be implemented in other embodiments. The subject disclosure is understood to encompass the present invention and any and all modifications, variations, or equivalents that fall within the spirit and scope of the basic underlying principles disclosed and claimed herein.

What is claimed is:

1. A method for implementing a guaranteed observance window comprising:
   determining an available message size for a message;
   determining an observance window;
   setting a time slot sensitivity based on the available message size and the observance window;
   detecting a first event;
   setting a first bit of the message to a logic high in response to the detecting of the first event; and
   setting a second bit of the message to a logic high after a first time period has elapsed since the setting of the first bit,
   wherein the first time period is based on the time slot sensitivity.

2. The method of claim 1 further comprising:
   resetting the first bit of the message to a logic low after the first time period has elapsed since the setting of the first bit.

3. The method of claim 1, wherein the second bit is positioned in a location that immediately follows the first bit in the message.

4. The method of claim 1, further comprising transmitting a first data packet including the message.

5. A device for implementing a guaranteed observance window comprising:
   a processor configured to:
     determine an available message size for a message;
     receive an observance window;
     set a time slot sensitivity based on the available message size and the observance window;
     detect a first event;
     set a first bit of the message to a logic high in response to the detecting of the first event; and
     set a second bit of the message to a logic high after a first time period has elapsed since the setting of the first bit,
   wherein the first time period is based on the time slot sensitivity.

6. The device of claim 5, wherein the processor is further configured to:
   reset the first bit of the message to a logic low after the first time period has elapsed since the setting of the first bit.

7. The device of claim 5, wherein the second bit is positioned in a location that immediately follows the first bit in the message.

8. A method for implementing a guaranteed observance window comprising:
   detecting a first event;
   setting a first bit of a data packet located at a first location within the data packet to a logic high; and
   updating the first location of the first bit such that the first location corresponds to a first number of time intervals that have elapsed since the detecting of the first event.

9. The method of claim 8 further comprising:
   determining whether a second event has been detected;
   in response to detecting the second event, setting a second bit of the data packet located at a second location within the message to a logic high; and
   updating the second location of the second bit such that the second location corresponds to a second number of the time intervals that have elapsed since the detecting of the second event.

* * * * *